(12) United States Patent
Hong

(10) Patent No.: US 8,506,747 B2
(45) Date of Patent: Aug. 13, 2013

(54) LIQUID CRYSTAL DISPLAY AND MANUFACTURING METHOD OF THE SAME

(75) Inventor: Wang-Su Hong, Suwon-si (KR)

(73) Assignee: Samsung Display Co., Ltd. (KR)

( * ) Notice: Subject to any disclaimer, the term of this patent is extended or adjusted under 35 U.S.C. 154(b) by 1034 days.

(21) Appl. No.: 12/505,407

(22) Filed: Jul. 17, 2009

(65) Prior Publication Data

US 2010/0080937 A1    Apr. 1, 2010

(30) Foreign Application Priority Data

Sep. 26, 2008   (KR) .................. 10-2008-0094728

(51) Int. Cl.
| | |
|---|---|
| B29C 65/00 | (2006.01) |
| B32B 37/00 | (2006.01) |
| B32B 38/04 | (2006.01) |
| B32B 38/14 | (2006.01) |
| B65C 9/25 | (2006.01) |
| B65C 11/06 | (2006.01) |
| C09J 5/06 | (2006.01) |

(52) U.S. Cl.
USPC .................. 156/275.5; 156/273.5; 156/277; 156/320

(58) Field of Classification Search
USPC ............ 156/60, 99, 100, 145, 230, 232, 235, 156/237, 242, 246, 272.2, 273.3, 273.5, 273.7, 156/275.1, 275.3, 275.5, 275.7, 277, 290, 156/291, 292, 297, 298, 303.1, 311, 320, 156/156/325, 326, 327, 330.9, 331.1, 331.7, 156/331.8, 331.9
See application file for complete search history.

(56) References Cited

U.S. PATENT DOCUMENTS 6,471,814 B2 *   10/2002   Ito et al. .................. 156/247

FOREIGN PATENT DOCUMENTS

| JP | 05-093913 | | 4/1993 |
|---|---|---|---|
| JP | 2004-012772 | A | 1/2004 |
| JP | 2003-295164 | A | 2/2004 |
| JP | 2004-053851 | A | 2/2004 |
| JP | 2005-354042 | A | 12/2005 |
| JP | 2006-079057 | A | 3/2006 |
| KR | 1020010077357 | A | 8/2001 |
| KR | 1020050066747 | A | 6/2005 |
| KR | 1020070040700 | A | 4/2007 |
| KR | 1020070045880 | A | 5/2007 |
| KR | 1020070070028 | A | 7/2007 |
| KR | 1020070080756 | A | 8/2007 |
| KR | 1020080012072 | A | 2/2008 |

* cited by examiner

*Primary Examiner* — Philip Tucker
*Assistant Examiner* — Brian R Slawski
(74) *Attorney, Agent, or Firm* — Innovation Counsel LLP

(57) ABSTRACT

A manufacturing method of a liquid crystal display according to an exemplary embodiment of the present invention includes: coating spherical spacers mixed with a first adhesive on a first insulation substrate; coating a second adhesive on the spherical spacers; aligning the second insulation substrate with the first insulation substrate to contact the second adhesive; and hardening the first adhesive and the second adhesive to adhere the spherical spacers to the first insulation substrate and the second insulation substrate.

8 Claims, 4 Drawing Sheets

LIQUID CRYSTAL DISPLAY AND MANUFACTURING METHOD OF THE SAME

CROSS-REFERENCE TO RELATED APPLICATION

This application claims priority to and the benefit of Korean Patent Application No. 10-2008-0094728 filed in the Korean Intellectual Property Office on Sep. 26, 2008, the entire content of which is incorporated herein by reference.

BACKGROUND OF THE INVENTION (a) Field of the Invention

The present invention relates to a liquid crystal display and a manufacturing method thereof.

(b) Description of the Related Art

A liquid crystal display includes a thin film transistor array panel formed with a thin film transistor, a color filter array panel formed with a color filter, and a liquid crystal layer formed therebetween. The liquid crystal display is widely used in display devices that are incorporated into various products such as laptops, monitors, televisions, and mobile phones. Accordingly, a flexible display panel that is thin, lightweight, low in cost, and durable is required.

To manufacture a flexible display panel, a flexible substrate is typically used as an insulation substrate that supports the thin film transistor or the color filter. The flexible substrate may use a plastic substrate material having high thermal resistance, high transmission, and high contraction, a glass that does not easily break on impact and may be easily bend, or a hybrid type thereof.

When bending a flexible display panel, the degree and manner in which the panel is bent is different between the edge and the center of the substrate such that the cell gap becomes different between the center and the edge. More specifically, the center of the substrate is compressed, and the cell gap is reduced while the cell gap at the edge is increased from the stretching.

If the cell gap is changed in this way, the luminance is varied according to the change of the cell gap, and a spacer that is not fixed moves, damaging the alignment layer and generating defects.

The above information disclosed in this Background section is only for enhancement of understanding of the background of the invention and therefore it may contain information that does not form prior art.

SUMMARY OF THE INVENTION

Accordingly, the present invention provides a liquid crystal display and a manufacturing method thereof having uniform luminance by maintaining a stable cell gap.

A manufacturing method of a liquid crystal display according to an exemplary embodiment of the present invention includes: coating spherical spacers with a first adhesive on a first insulation substrate; coating a second adhesive on the spherical spacers; aligning the second insulation substrate to contact the second adhesive; and hardening the first adhesive and the second adhesive to adhere the spherical spacers to the first insulation substrate and the second insulation substrate.

The method for coating the spherical spacers may be roll printing.

The first adhesive and the second adhesive may be made of the same material.

The hardening of the first adhesive and the second adhesive to adhere the spherical spacers to the first insulation substrate and the second insulation substrate may include firstly hardening the first and second adhesives through UV irradiation, pressing and attaching the first insulation substrate and the second insulation substrate to each other after softening the first and second adhesives through heat treatment, and secondly hardening the first and second adhesives through UV irradiation.

The first and second adhesives may be acryl-based adhesives.

The UV irradiation may be executed within 30 seconds.

The heat treatment may be executed in a temperature of 100° C. for 30 minutes.

The insulation substrate may be a flexible substrate.

The flexible substrate may be a plastic substrate.

A liquid crystal display according to the present invention includes: first and second insulation substrates facing each other; liquid crystal filled between the first and second insulation substrates; a plurality of spherical spacers formed between the first and second insulation substrates and contacting the first and second insulation substrates; and an adhesive adhering the spherical spacers to the first and second insulation substrates.

An area where the adhesive contacts the first insulation substrate and the second insulation substrate may be larger than a cross-section of the spherical spacers that is taken along a plane surface at the same distance from the first insulation substrate and the second insulation substrate.

The area where the adhesive contacts the first insulation substrate and the second insulation substrate may be larger than a sum of the cross-section of each spherical spacer and a cross-section of the adhesive that are taken along a plane surface at the same distance from the first insulation substrate and the second insulation substrate.

The adhesive may be an acryl-based adhesive.

The insulation substrate may be a flexible substrate, and the flexible substrate may be a plastic substrate.

In the present invention, the adhesive is applied to the spacers such that the adherence of the spacers is improved, and a uniform cell gap may be maintained even when the substrate is bent.

Accordingly, a liquid crystal display having uniform luminance and high quality may be provided.

DETAILED DESCRIPTION OF THE EMBODIMENTS

Figure 1:
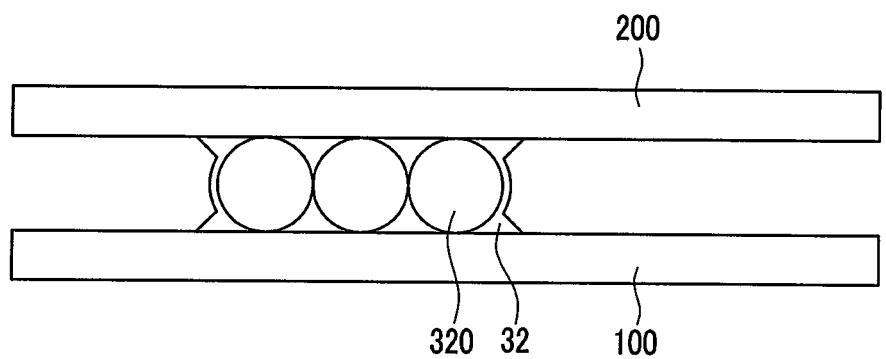
FIG. 1 is a cross-sectional view of a liquid crystal display according to the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display panel according to an exemplary embodiment of the present invention will be described with reference to FIG. 1.

FIG. 1 is a cross-sectional view of a liquid crystal display according to the present invention.

A liquid crystal display according to the present invention includes a lower panel 100 and an upper panel 200 facing each other, and a liquid crystal layer (not shown) interposed between the two display panels.

The lower panel 100 includes a gate line, a data line, and a thin film transistor formed on a flexible insulation substrate, and a pixel electrode connected thereto.

The flexible insulation substrate includes an organic layer made of at least one material selected from the group of polyethylene ether phthalate, polyethylene naphthalate, polycarbonate, polyarylate, polyether imide, polyether sulfonate, polyimide, or polyacrylate. The flexible insulation substrate may further include an under-coating layer (not shown) such as an acryl-based resin, a barrier layer (not shown) such as $SiO_2$ or $Al_2O_3$, and a hard-coating layer (not shown) such as an acryl-based resin, that are sequentially formed on both surfaces of the organic layer. These layers or films prevent the flexible insulation substrate from being physically and chemically damaged.

The upper panel 200 includes a substrate that is made of the same material as the flexible insulation substrate of the lower panel 100, and a color filter and a common electrode are formed on the flexible insulation substrate. The color filter may be formed on the lower panel 100.

Spherical spacers 320 to maintain the interval between the two panels 100 and 200 are dispersed between the panels 100, 200, and the spherical spacers 320 are adhered to the two substrates by an adhesive 32.

The adhesive 32 according to the present exemplary embodiment is spread according to the surface of the substrate with reference to the center of the spherical spacers 320. That is, the adhesive 32 is included with the spherical spacers 320 and fills the space between the spherical spacers 320, and the adhesive 32 disposed under and on the spherical spacers 320 is spread according to the surface of the display panels 100 and 200 to thereby fix the spherical spacers 320 and the display panels 100 and 200.

Figure 2:
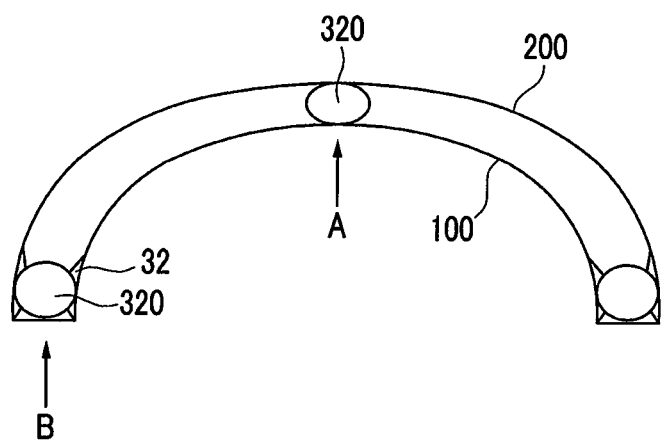
FIG. 2 is a cross-sectional view of a liquid crystal display according to the present invention upon bending.

Accordingly, in the present exemplary embodiment, the upper portion and the lower portion of the spherical spacers 320 are adhered to the display panels 200 and 100 by the adhesive 32 such that the substrates are not separated at the edge of the liquid crystal cell when bending the liquid crystal cell. That is, as shown in FIG. 2, when bending the liquid crystal cell, a force pressing on the two substrates at the central portion A of the cell tends to reduce the cell gap, and the substrates tend to move away from each other at the edge B of the cell. However, the adhesive 32 of the spherical spacers 320 fixes the substrates at the edge such that the cell gap is not increased at the edge of the cell.

Accordingly, the cell gap may be uniformly maintained, thereby producing uniform luminance.

Next, a manufacturing method of the liquid crystal display shown in FIG. 1 will be described with reference to FIGS. 3 and 4 as well as FIG. 1.

Figure 3:
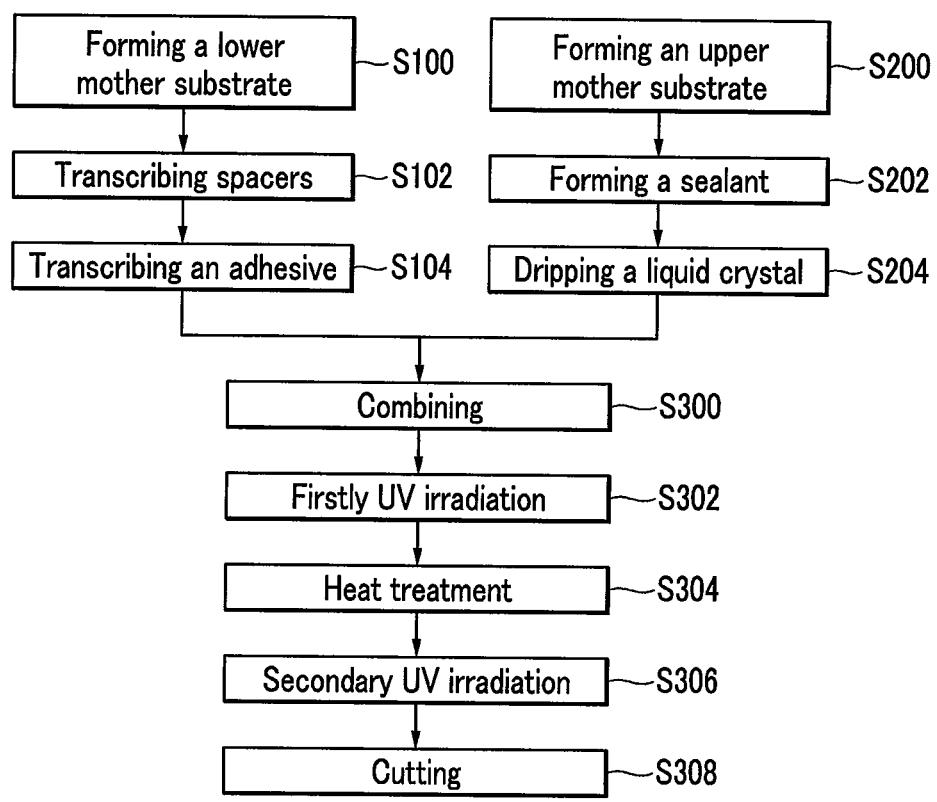
FIG. 3 is a flowchart explaining a manufacturing method of a liquid crystal cell for a liquid crystal display according to the present invention.

First, as shown in FIG. 3, lower and upper mother substrates are separately prepared (S100 and S200). The lower mother substrate may be a substrate on which a plurality of lower panels 100 shown in FIG. 1 are formed, and the upper mother substrate may be a substrate on which a plurality of upper panels 200 shown in FIG. 1. Next, a sealant is applied on the upper mother substrate to define a region that will hold the liquid crystal layer (S202). The sealant may be made of a material that is hardened by light such as UV. Next, a liquid crystal material is dripped in the region enclosed by the sealant (S204).

Spherical spacers to maintain the interval between the upper and lower mother substrates are formed on one or both of the upper and lower mother substrates (S102). Although FIG. 3 shows that spacers are formed only on the lower mother substrate, this is not a limitation of the invention as the spacers may be formed on the upper substrate instead of or in addition to the lower substrate. In the present exemplary embodiment, the spherical spacers are formed on the lower mother substrate. The adhesive 32 is then applied around the spherical spacers (S104).

Figure 4:
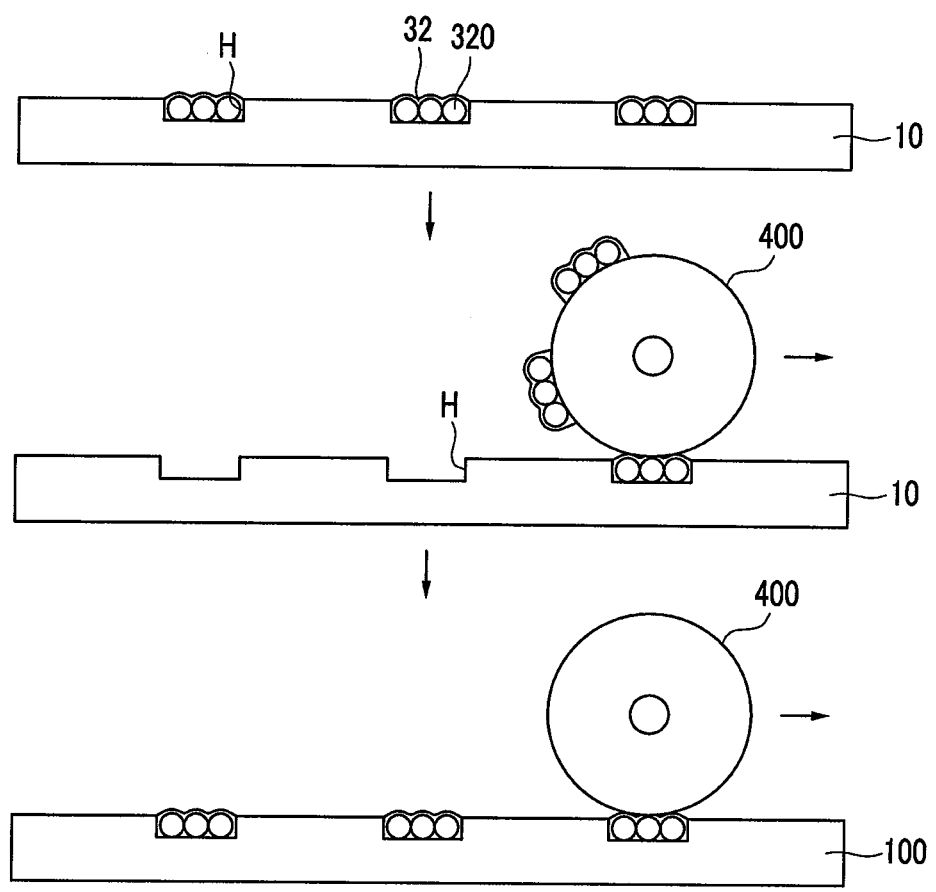
FIG. 4 is a view for explaining a roll printing method according to an exemplary embodiment of the present invention.

The spherical spacers 320 may be deposited through a roll printing method illustrated in FIG. 4. Referring to FIG. 4, an adhesive 32 including the spherical spacers 320 is filled in a groove H formed in a glass mask 10. FIG. 4 shows that the spacers 320 are formed in "clusters"—in the particular example, a cluster of spacers 320 includes three spacers 320. In the finished device, an area where the adhesive 32 contacts the first insulation substrate and the second insulation substrate in a cluster is larger than a cross-section of the spherical spacers that is taken along a plane halfway between the first insulation substrate and the second insulation substrate in the same cluster.

The spherical spacers 320 on the mask 10 are transcribed to the surface of a panel by using a roller 400 The spherical spacers 320 are first placed on the roller 400 and then transcribed from the roller 400 to the lower mother substrate 100 (S102). As shown in FIG. 4, some adhesive 32 is transcribed along with the spherical spacers 320.

Referring to FIG. 2, additional adhesive 32 is transcribed on the spherical spacers 320 (S104). The adhesive 32 may be formed with the same method as that for forming the spherical spacers. That is, the adhesive fills the glass mask 10 that is used when coating the spherical spacer 320, and the adhesive may be additionally transcribed only on the transcribed spherical spacers 320 by using the roller 400(not shown). The adhesive 32 used in this process may be the same adhesive that is used in the spacer transcription process of FIG. 4.

The adhesive 32 used when transcribing the spherical spacers 320 tends to flow to a side of the lower mother substrate 100 after transcription, leaving little adhesive 32 at the upper portion of the spherical spacers 320. However, in the present invention, additional adhesive 32 is transcribed such that sufficient adhesive remains on the spherical spacers 320.

The adhesive 32 is made of an adhesive that is hardened by UV such as an acryl-based material, and an epoxy resin may be further included.

The upper mother substrate 200 is aligned with the lower mother substrate 100 to contact the adhesive 32 of the spherical spacers 320 (S300). Then, the UV is irradiated to firstly harden the adhesive 32 including the spherical spacers 320 (S302). In the first hardening, the two mother substrates are fixed so that they may not move. The UV irradiation is executed for a time not exceeding 30 seconds.

The UV irradiation may be executed before aligning the upper mother substrate. However, the upper mother substrate must be moved in a chamber for the hardening process and the aligning process such that it is preferable that the UV irradiation is executed after aligning.

Next, heat treatment is executed for a predetermined length of time (S304). Before the first hardening, most of the adhesive 32 is included at the spherical spacers such that the adhesive 32 may be fixed to the surface of the substrate through the first hardening in a state of incomplete hardening. Accordingly, in the present invention, the heat treatment is executed to provide liquidity to the adhesive 32 such that the adhesive 32 is spread according to the surface of the mother substrate, as shown in FIG. 1, and thereby the area where the adhesive 32 and the two substrates contact each other may be increased.

After the adhesive 32 having liquidity is sufficiently spread according to the surface of the substrate, the heat treatment is finished. It is preferable that the heat treatment is executed at a temperature of about 100° C. for about 30 minutes.

Next, second hardening of the adhesive 32 is executed by irradiating UV (S306). Here, the adhesive 32 is completely hardened so that it may no longer move, and the spread shape of the adhesive 32 is fixed through the heat treatment.

Next, the two mother substrates that are combined are cut up into liquid crystal cell units (S308).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for manufacturing a liquid crystal display comprising:
   coating spherical spacers mixed with a first adhesive on a first insulation substrate;
   coating a second adhesive on the spherical spacers;
   aligning a second insulation substrate with the first insulation substrate to contact the second adhesive; and
   hardening the first adhesive and the second adhesive to adhere the spherical spacers to the first insulation substrate and the second insulation substrate, wherein the hardening of the first adhesive and the second adhesive to adhere the spherical spacers to the first insulation substrate and the second insulation substrate includes:
      hardening the first and second adhesives through UV irradiation, pressing and attaching the first insulation substrate and the second insulation substrate to each other after softening the first and second adhesive through heat treatment, and
      hardening the first and second adhesives through an UV irradiation for a second time.

2. The method of claim 1, wherein coating the spherical spacers comprises roll printing.

3. The method of claim 2, wherein the first adhesive and the second adhesive are made of the same material.

4. The method of claim 1, wherein the first and second adhesives are acryl-based adhesives.

5. The method of claim 1, wherein the UV irradiation is executed within 30 seconds.

6. The method of claim 1, wherein the heat treatment is executed in a temperature of 100° C. for 30 minutes.

7. The method of claim 1, wherein the insulation substrate is a flexible substrate.

8. The method of claim 7, wherein the flexible substrate is a plastic substrate.

* * * * *